(12) United States Patent
Hofmann et al.

(10) Patent No.: US 7,514,025 B2
(45) Date of Patent: Apr. 7, 2009

(54) METHOD FOR PRODUCING A FIBROUS MATERIAL

(75) Inventors: Michael Hofmann, Buxtehude (DE); Andreas Holm, Apensen (DE); Dirk Venschott, Hamburg (DE)

(73) Assignee: CVP Clean Value Plastics GmbH, Buxtehude (DE)

( * ) Notice: Subject to any disclaimer, the term of this patent is extended or adjusted under 35 U.S.C. 154(b) by 62 days.

(21) Appl. No.: 10/564,216

(22) PCT Filed: Jul. 7, 2004

(86) PCT No.: PCT/EP2004/007457

§ 371 (c)(1), (2), (4) Date: Jan. 6, 2006

(87) PCT Pub. No.: WO2005/002817

PCT Pub. Date: Jan. 13, 2005

(65) Prior Publication Data

US 2006/0186233 A1    Aug. 24, 2006

(30) Foreign Application Priority Data

Jul. 7, 2003   (DE) ................. 103 30 756
Jun. 22, 2004  (DE) ........... 10 2004 030 509

(51) Int. Cl.
*B02C 21/00* (2006.01)
*B02C 7/04* (2006.01)
*B27N 3/00* (2006.01)

(52) U.S. Cl. ............... 264/109; 241/23; 241/261.2; 241/21

(58) Field of Classification Search ............... 241/18.3, 241/21, 28, 261.2, 261.3
See application file for complete search history.

(56) References Cited

U.S. PATENT DOCUMENTS

| 3,150,834 A | * | 9/1964 | Doyle et al. ................ 241/15 |
| 5,057,166 A |  | 10/1991 | Young, Sr. et al. |
| 5,154,361 A | * | 10/1992 | Willoughby .............. 241/16 |

FOREIGN PATENT DOCUMENTS

| AT | 343 445 | 11/2006 |
| DE | 198 01 286 C1 | 7/1999 |
| DE | 198 22 627 C2 | 11/1999 |
| DE | 103 26 181 A1 | 12/2004 |

* cited by examiner

*Primary Examiner*—Faye Francis
(74) *Attorney, Agent, or Firm*—Vidas, Arrett & Steinkraus, P.A.

(57) ABSTRACT

Method for producing a fibrous material for the manufacturing of preformed parts, in which a binder is added to the fibrous material and it is pressed into a preformed part upon application of heat, characterised in that a portion of particles of plastics and/or fibers from plastics is admixed to a particle or fiber mass of a first group of particles or fibers, the particle size of said particles from plastics and/or fibers from plastics approximately corresponding to the particle size of the particles or fibers of the first group, wherein the particles from plastics and/or fibers from plastics are obtained by crushing and/or defibrating agglomerates of pure or mixed plastics in a disc refiner, and that if necessary water is fed into the disc refiner during the crushing process.

18 Claims, No Drawings

METHOD FOR PRODUCING A FIBROUS MATERIAL

CROSS-REFERENCE TO RELATED APPLICATIONS

Not Applicable

STATEMENT REGARDING FEDERALLY SPONSORED RESEARCH

Not Applicable

BACKGROUND OF THE INVENTION

In the previous patent application DE 103 26 181 it is described to substitute a part of the wood chips or fibres in the production of wood material boards, i.e. wood chip and wood fibre board in particular, by milled or defibrated agglomerate from mixed plastics from the refuse collection. The dimensions of the plastics particles on the one hand, and the wood chips or fibres on the other hand, are approximately equal. Thus, a possibility of a complete material utilization of mixed plastics has been created.

In current collection systems for refuse plastics, e.g. packaging material from consumer households, joghurt cups, protective wrappings, shopping bags, bottles for cleaning materials, toothpaste tubes and so on, mixed plastics are mostly obtained. Besides to the usual sheets and plastics from LDPE, HDPE or PP, they often comprise sheet remainders from polyamides, polycarbonates, PET or other plastics. The quantitative distribution of the content of the different plastics which are handed over to the processing and assorting plants by the collecting firms depends from the collecting behaviour and the quality-consciousness of the population. In spite of advanced assortment, a complete separation of the different kinds of plastics cannot be obtained. A clearly-sorted separation between LDPE sheets and HDPE sheets can be obtained with a quota of approximately 95%. However, besides there are collecting systems for LDPE and HDPE only, in which predominantly plastic sheets are collected which were produced via a sheeting calender.

Sheet or bottle fractions from collecting systems are crushed into flakes or chips, optionally after being cleaned and presorted. In order to get sufficient bulk density for transportation, the flakes or chips are processed into a granular material in a so-called agglomerating process. Depending on purity and sorting, the granular material is very uniform (at high degree of purity of the sorts of the plastics), or it has a very inhomogeneous structure from the viewpoints of appearance as well as from those of the consistency and geometry of the agglomerate (high degree of mixing of the most different sorts of plastics from various sources, e.g. mixed plastics from household collection systems). In the processing, the mentioned agglomerating, the flakes or chips are heated by friction in a stirring machine such that they melt on. By spraying of the warmed agglomerate with cold water, which is performed at intervals, a part of the organic constituents escapes via the water vapour. At the same time, the molten-on sheet pieces cool down and agglomerate into granulate-like, throwable bodies. The agglomerate has a relatively high bulk density and is very suited for transportation. Agglomerating methods have been described in AT 343445 or DE 198 01 286 C1, for instance.

In the substitution of wood chips or fibres through plastics, it is to be demanded that the plastics particles be similar to the substituted wood particles of chip board or fibre board in their geometric form and dimension, in order to obtain results that are similar to those of conventional wood material boards. As a consequence, in fibre materials the fibre content should prevail, and in chip materials the chip content.

The commonly produced agglomerate is present in very different forms and sizes, and thus it is not suited as a raw material in the production of wood materials, because strong demixing behaviour is presented in the blending process, due to the different sizes of the fractions. Board materials which are produced with these two fractions have an uneven surface appearance, mostly on the surface of the workpiece, which is due to local agglomerate accumulations, and thus they make the insufficient mixing of the two fractions visible. Further, the formation of a continuous plastics-plastics or plastics-wood texture, respectively, having a homogeneous texture structure, is not ensured due to the insufficient mixing. Furthermore, the desired mechanical properties, like transverse pull strength, flexural strength and also the desired behaviour in humid conditions, like swelling behaviour and water absorption, are not attainable.

As has been already described in the previous patent application, crushed agglomerate is used for these reasons, for which purpose different milling technologies can be used. For a producer of wood materials who wants to use milled plastics agglomerate, there only remains to buy milled plastics agglomerate from a third side or to invest into a sumptuous milling machine.

A similar problem results for producers which make materials from other fibrous materials, e.g. from vegetable fibres like those from flax or hemp, or even from glass or carbon fibres. When these fibres are to be mixed with fibres from recycled plastics in order to prepare a corresponding fibrous material, the plastics agglomerate should be milled by the producer himself, which requires a suitable milling machine, or it should be acquired in a milled form from a third side, which also requires a relatively high expenditure.

From U.S. Pat. No. 5,154,361A a method for crushing plastics parts has become known, in which a suspension of the plastics particles in water is passed through a disc refiner, together with an antifoaming agent. In one example, the suspension contains 3% solid matter. Cellulose fibres can also be admixed to the suspension.

From EP 0 588 023A a method for producing a compound body has become known, in which plastic-coated compound materials, preferably paper or cardboard, are used as the starting materials. The compound materials are crushed into particles and thereafter the mass is warmed to at least the melting temperature of the plastics of the compound materials and is bonded to each other under pressure. From DE 101 28 549 it has become known to produce performed parts from natural fibers or chips by adding a plastics polymer as a binder. The performed part is prepared without extrusion.

BRIEF SUMMARY OF THE INVENTION

According to the invention, a portion of particles of plastics and/or fibres from plastics is admixed to a particle or fibre mass of a first group of particles or fibres, the particle size of said particles from plastics and/or fibres from plastics approximately corresponding to the particle size of the particles or fibres of the first group, wherein the particles from plastics and/or fibres from plastics are obtained by crushing and/or defibrating agglomerates of pure or mixed plastics in a disc refiner. In doing so, water or another liquid may be added as a lubricant to the disc refiner during the crushing operation. Disc refiners are conventional devices which are widely used for the defibration of bigger wood particles or hogged wood chips, respectively, in the wood material industry (see Holz-Lexikon, 3. Auflage, Band 2, pp. 580-584). The dimension of the crushed plastics particles is adjusted via the distance of the discs. With coarser agglomerate, stepwise crushing by stepwise decreasing the disc distance in the refiner may be performed, as the case may be.

When crushing plastics in the refiner, water is added for cooling purposes. By doing so it is prevented that the plastic material melts on and is smeared over the disc surfaces during the crushing process. Additionally, the water acts as a sliding and lubricating agent between the refiner discs.

Sheet materials have predominantly a linear molecule orientation, which is produced by stretching- and expanding processes in the manufacture thereof, of polyethylene or polypropylene sheets for instance. This has the consequence that agglomerates from this source plastics are apt to be easily separated in one direction preferably, namely the original preferential direction. The crushing process of agglomerated pure plastics agglomerates in the refiner makes use of this property and enables the predominantly oblong, fibre-like appearance of the defibrated low-melting pure plastics agglomerates, by the radial, groove-like structure of the refiner discs. By changing the distance of the discs in the refiner, a relatively accurately defined fibre size is attained. Thus it is possible to adjust the fibre dimension of the agglomerate plastics to the size of the wood fibres, in order to obtain a homogeneous structure of the texture for the further production process.

With the method according to the invention, mixed plastics agglomerates may also be crushed. In doing so, the mixed plastics agglomerates are crushed proportionally into particles on the one hand and fibres on the other hand of defined size by the processing in the refiner. As is natural, the proportion of the particles on the one hand and that of the fibres on the other hand varies, depending on the composition of the mixed plastics agglomerate. The higher the content of sheet plastics in the agglomerate, the higher is also the proportion of plastics fibres which result from the refining process.

As a consequence, the producer of wood materials or preformed parts from wood material, respectively, like boards or others objects, can process the recycled plastics in the agglomerated state with his own means, with the aid of already present machinery arrangements, up to a condition such that he is provided with the desired substitution material for the manufacture of the preformed parts. At present, the utilization quota of agglomerated recycled plastics is still relatively low, because up to now, there are hardly applications for it that make sense. The reason for this is that mixed plastics mostly have constituent substances which do not melt at all. Even at high temperatures, only a highly viscous mass is often obtained, which does not become fluid even upon increasing warming. On the other hand, mixed plastics contain sorts that already melt at from 105 to 115° C. When this melting point is exceeded, these plastics decompose to carbon under exhalation of carbon dioxide and water.

The method according to the present invention is not limited to its application for wood materials, but is advantageous in a similar degree when other fibrous materials from flax, hemp, glass or carbonized materials, for instance, are used.

A condition for the method according to the present invention is a disc refiner, with the aid of which synthetic fibre materials can be prepared in a dimension which is accurately adjustable without additional milling instrumentation, e.g. in the production of wood material boards with plastics contents or of other preformed parts from fibrous materials with plastics contents.

According to one embodiment of the invention, it is advantageous when the plastics particles or fibres coming out of the refiner are subsequently dried. The drying can take place in conventional industrial drying equipments, which are also at disposal in production plants for the manufacturing of wood materials.

It may be advantageous to crush or to defibrate, respectively, the plastics agglomerate alone in the disc refiner. However, it is as well conceivable to crush a mixture of coarser wood particles (hogged chips) and plastics agglomerate in one single operation in the disc refiner. In this way, an approximately equal particle size is obtained for the wood as well as for the for the plastics. In addition, a good mixing of the plastics with the wood particles is achieved.

In the following, some examples for a fibrous material which had been prepared according to the method of the present invention, and also for the method according to the present invention will be given.

EXAMPLE 1

Defibration of pure plastics in a disc refiner.

raw material of the plastics: low-melting agglomerate of pure plastics from sheet remainders, grain size <10 mm.

cooling and lubricating agent: water, temperature 10° C., content 300% with respect to the amount of plastics agglomerate.

EXAMPLE 2

Crushing of mixed plastics agglomerates and wood particles in a disc refiner.

wood raw material: wood particles, chip-like, length up to 10 mm, humidity of the wood about 6%.

plastics raw material: mixed plastics agglomerate, grain size <10 mm.

cooling and lubricating agent: water, temperature 10° C., content 300% with respect to the amount of wood particles and plastics agglomerate.

In spite of the previous treatment, the agglomerate may anyway still contain organic contaminations, like remainders of joghurt for instance.

It is therefore desired to create a method in which fibrous materials from plastics have a sufficiently high degree of purity.

Before the crushing process begins, at least the agglomerate fraction is subjected to a boiling process and adhering contaminations are removed. The hot steam boiler is operated at temperatures of from 100° C. to 180° C. and preferably with an excess pressure of from 1 to 4 bars, the boiling time being from 3 to 10 minutes according to one embodiment of the invention.

Because of the warm-humid atmosphere in boilers, the organic contaminations still adhering to the agglomerate are released and are segregated via the waste water after the boiling operation. The waste water can be clarified in a biological clarification plant, then be evaporated and incinerated or directly fed into the incinerating plant as vapour. After the boiling process, the purified agglomerate—or a mixture of hogged wood chips and agglomerate respectively, e.g.— reaches the refiner via a stuffing or feeding screw. The proportion of agglomerate is in the range of 0 to 95% with respect to the overall mass, the remainder being preferably formed by hogged wood chips or particles. As mentioned, pure agglomerate can also be added into the boiler and/or the refiner.

By the mentioned boiling treatment, sterilisation of the agglomerate is obtained. Carbohydrate- and protein compounds which were altered by the agglomeration process, e.g., are dissolved out and degraded by the boiling process.

The material which was crushed in the refiner is dried to a desired final humidity. According to one embodiment of the invention, the humid stock is dried by means of a continuously circulating hot steam flow which is under an interior excess pressure, for which purpose a per se known so-called hot steam fibre dryer with a temperature of about 180° C. can be used. During the residence time in the dryer (the drying pipe) the fibres which were crushed in the refiner are dried to the desired final humidity. The circulated hot steam flow is recycled again, after it had been heated, by preference in a heat exchanger. By recycling the hot steam flow, very small particles (dusts) are recycled into the dryer. In the refiner, up to 20% fine particle content can be generated from the agglomerate, which is partly withdrawn by the hot steam flow. When the fine particle content is recycled in the cycle, modification of the fibre material takes place such that the fine particle content of the agglomerate bonds to the wood fibres. This results in a hydrophobisation of the wood fibres and to sizing of the fibres with the fine particle content of the agglomerate. Through this, the fine particle content is not lost in the drying operation, but it is used and as mentioned it leads to an improvement of the fibre mixture, because other glue portion can be saved. In addition, the waste disposal of the fine particle parts can be omitted. If the described method would not be used, segregation of fibres and fine particle contents would take place. Due to the different particle sizes, the milled agglomerate would flow out of the fibre bundles.

Depending on the composition of the agglomerate used, a mixture of defibrated agglomerate and milled aggregate is generated by the described refiner process. Due to their constitution, LDPE contents in the agglomerate, from longitudinally stretched sheets for instance, lead to fibre-like material in the refiner process. For instance, when pure sheet agglomerates with exclusively PE-contents are crushed in the refiner, predominantly fibrous material is generated.

Contents of crosslinked plastics in the agglomerate, like HDPE, PP or PET for instance, are rather crushed into grist in the refiner. When too much grist is undesired in the production process for preformed parts, like wood material boards, for instance, it may be also sieved out by a sieving process, an air classification method e.g.

In addition, the mixture of fibres and grist which is generated by the refiner process still has the following causes: when the agglomerate particles are crushed in parallel to the stretching direction of the original plastics by the ribs of the refiner discs, agglomerate fibres are generated. When the agglomerate particles are crushed in traverse to the stretching direction of the original plastics by the ribs of the refiner discs, a grist is generated.

When hogged wood chips and agglomerate are crushed together in the conventional refiner process, preformed parts from wood material, for instance boards, can be produced based on the last-described method from the resulting fibrous stock without addition of additional binders, on the discontinuous or continuous production machines for wood materials which are used in the industry.

The fibrous stock prepared according to the method of the invention can also be used for the production of insulation material boards with wood fibre content in an aerodynamic laying method for nonwovens or fibres, respectively, in which case the addition of so-called core-coat-fibres, the so-called BiCo-fibres (two-component fibres, polypropylene fibres with low-melting coat and higher melting core) as a binder may be omitted. It is not necessary to add further binder. Methods with aerodynamic nonwoven formation have been described in AT 207674, for instance. A process for producing insulation material boards with binder fibre content, involving aerodynamic nonwoven formation and warming the fibre nonwoven in a rapid packager drier has become known from DE 100 56 829 A1.

By using boiled and refined agglomerate instead of the core-coat-fibres, inexpensive insulation material boards in a region of raw density from 60-300 kg/m$^3$ can be produced without addition of additional binder. When the highly pure agglomerate fibres are used for the production of insulation materials, elastic insulation material boards with high restoring force are generated, as a consequence of the multiplicity of the binding sites of the agglomerate fibres with the wood fibres. Presumed the wood humidity is u=7%, the proportion of the agglomerate fibres may be between 5 and 80% with respect to the mass of the wood fibres used. The production of different kinds of insulation materials with agglomerate fibres will be described in more detail in examples 4 and 5. Example 6 describes the use of the boiled and refined agglomerates for the use in wood material boards with higher densities.

EXAMPLE 3 boiler settings temperature 175° C., excess pressure: 4 bars, boiling time 5 min.

EXAMPLE 4 insulation material in the raw density range 60-120 kg/m$^3$ aimed raw density: 100 kg/m$^3$ thickness: 100 mm agglomerate fibre content of 60% with respect to wood fibre mass at 7% wood humidity temperature in the rapid packager drier for activation of the thermoplastic agglomerate contents: 175° C., belt speed in the rapid packager drier: 0,5 m/min bulk density about 10 kg/m$^2$

EXAMPLE 5 insulation material in the raw density range 150-300 kg/m$^3$ aimed raw density: 250 kg/m$^3$ thickness 5 mm agglomerate fibre content of 40% with respect to wood fibre mass at 7% wood humidity temperature in the rapid packager drier for activation of the thermoplastic agglomerate contents: 175° C., belt speed in the rapid packager drier: 0,5 m/min bulk density about 1,25 kg/m$^2$

EXAMPLE 6

Chipboard aimed raw density: about 650 kg/m$^3$ thickness: 13 mm agglomerate fibre content of 30% with respect to wood fibre mass at 7% wood humidity temperature of the pressing platens in a multiplaten press about 240° C., at a pressing time factor of 15s/mm and an initial pressure of 6 bars for a duration of about 80 s, then pressure drop to 3,5 bars for keeping this pressure about 40s, further pressure drop to 1,5 bars for keeping this 70 s, then release of the pressure.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other maimers within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for producing a mixed material for the manufacturing of preformed parts, comprising:
    melting plastic chips together in a stirring machine;
    spraying the melted plastic chips with cold water periodically, thereby forming a plurality of bodies;
    crushing and/or defibrating at least some of the plurality of bodies in a disc refiner with water, thereby forming a first group of particles and/or fibres from plastic;
    mixing the first group of particles and/or fibres from plastic with a second group of fibres and/or particles to form a mixed material, the size of the particles or fibres of the first group approximately corresponding to the size of the particles or fibres of the second group;
    adding a binder to the mixed material; and
    pressing the binder and mixed material into a preformed part upon application of heat.

2. The method according to claim 1, wherein in that only pure plastics are crushed and/or defibrated in the disc refiner.

3. The method according to claim 1, wherein the particles and/or fibres of the plastics are dried after being crushed.

4. The method according to claim 1, wherein the second group of fibres and/or particles is obtained by defibrating flax, hemp, glass or carbonized material.

5. The method according to claim 1, wherein the second group of particles and/or fibres is obtained by crushing or defibration of wood.

6. The method according to claim 1, wherein at least some of the plurality of bodies together with wood particles, are crushed to particles and/or fibres in a disc refiner.

7. The method according to claim 1, wherein the temperature of the water is at most 50° C.

8. The method according to claim 1, wherein the water is supplied to the refiner via humid wood particles.

9. The method according to any one of claim 1, wherein the water is supplied to the refiner in a gaseous state.

10. The method according to claim 1, wherein each of the plurality of bodies has a maximum size of 40 mm.

11. The method according to claim 1, wherein the bodies to be crushed and/or defibrated are fed to the refiner via a stuffing screw.

12. The method according to claim 1, wherein at least the bodies to be crushed and/or defibrated are subjected to a boiling process before being crushed in the refiner, and adhering contaminations are removed.

13. The method according to claim 12, wherein the boiling process is performed at temperatures of from 100° C. to 180° C. and under an excess pressure of from 1 to 4 bars.

14. The method according to claim 12, wherein the boiling time is from 3 to 10 minutes.

15. The method according to claim 1, wherein the particles and/or fibres are dried to a desired final humidity after crushing in a hot steam flow and that the hot steam flow is fed back in a closed circuit into the material which is to be dried.

16. The method according to claim 15, wherein the hot steam flow is warmed up before it is guided back into the material that is to be dried.

17. The method according to any claim 4, wherein the bodies are crushed to particles and/or fibres in a disc refiner together with wood particles, and the crushed material is dried with hot steam in a flow circuit.

18. The method according to claim 1, wherein the bodies to be crushed and/or defibrated is fed to the refiner via a stuffing screw.

* * * * *